(12) United States Patent
Miyoshi

(10) Patent No.: US 12,455,554 B2
(45) Date of Patent: Oct. 28, 2025

(54) ASSISTANCE DEVICE FOR ANALYZING MACHINING CONDITIONS OF A MACHINE TOOL

(71) Applicant: FANUC CORPORATION, Yamanashi (JP)

(72) Inventor: Takashi Miyoshi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 325 days.

(21) Appl. No.: 17/759,897

(22) PCT Filed: Feb. 1, 2021

(86) PCT No.: PCT/JP2021/003482
§ 371 (c)(1),
(2) Date: Aug. 1, 2022

(87) PCT Pub. No.: WO2021/157509
PCT Pub. Date: Aug. 12, 2021

(65) Prior Publication Data
US 2023/0126840 A1 Apr. 27, 2023

(30) Foreign Application Priority Data

Feb. 6, 2020 (JP) .................... 2020-018618

(51) Int. Cl.
*G05B 19/4155* (2006.01)
(52) U.S. Cl.
CPC ............... *G05B 19/4155* (2013.01); *G05B 2219/36089* (2013.01)
(58) Field of Classification Search
CPC ............................... G05B 19/4155
See application file for complete search history.

(56) References Cited

U.S. PATENT DOCUMENTS

2006/0089746 A1  4/2006  Kakino et al.
2014/0033890 A1  2/2014  Kimura et al.
(Continued)

FOREIGN PATENT DOCUMENTS

JP    H09-312509 A    12/1997
JP    2001-125613 A    5/2001
(Continued)

OTHER PUBLICATIONS

International Search Report issued in PCT/JP2021/003482; mailed Mar. 23, 2021.
(Continued)

*Primary Examiner* — Nathan L Laughlin
(74) *Attorney, Agent, or Firm* — Studebaker Brackett PLLC

(57) ABSTRACT

Provided is an assistance device with which it is possible to discover optimal processing conditions more easily. An assistance device comprising: a program management unit that associates a plurality of verification results, in which a processing condition is verified using a verification function, with a processing program and stores the verification results in a verification result storage unit; an assessment unit that assesses whether each verification result satisfies a shape target value for a workpiece; and an advice unit that, when any of the verification results do not satisfy the shape target value for the workpiece, presents a modification of a processing condition on the basis of processing-condition-related information relating to the processing condition for the workpiece, the verification result, and the verification function.

6 Claims, 4 Drawing Sheets

(56) References Cited

U.S. PATENT DOCUMENTS

| | | | |
|---|---|---|---|
| 2015/0261204 A1* | 9/2015 | Honda | G05B 19/402 |
| | | | 700/114 |
| 2015/0277436 A1* | 10/2015 | Kalmar-Nagy | ............................ |
| | | | G05B 19/40937 |
| | | | 700/187 |
| 2017/0146985 A1* | 5/2017 | Maeda | G05B 23/027 |
| 2017/0227945 A1 | 8/2017 | Wang et al. | |
| 2018/0003487 A1* | 1/2018 | Takahashi | G06V 10/10 |
| 2019/0258219 A1 | 8/2019 | Koga | |
| 2022/0155750 A1* | 5/2022 | Matsui | G05B 19/4069 |
| 2022/0236722 A1* | 7/2022 | Domori | G05B 19/41865 |

FOREIGN PATENT DOCUMENTS

| | | |
|---|---|---|
| JP | 2001-219341 A | 8/2001 |
| JP | 2007-102632 A | 4/2007 |
| JP | 2007-326174 A | 12/2007 |
| JP | 2013-084035 A | 5/2013 |
| JP | 2019-008505 A | 1/2019 |
| WO | 2019/168018 A1 | 9/2019 |

OTHER PUBLICATIONS

International Search Report issued in PCT/JP2021/003484; mailed Mar. 23, 2021.
An Office Action; mailed by the United States Patent and Trademark Office on Dec. 12, 2024, which corresponds to U.S. Appl. No. 17/759,989 and is related to U.S. Appl. No. 17/759,897.

* cited by examiner

FIG. 2

| PROGRAM 1 | | | | |
|---|---|---|---|---|
| VERIFICATION RESULT | VERIFICATION CONDITION a | VERIFICATION CONDITION b | VERIFICATION CONDITION c | VERIFICATION CONDITION d |
| VERIFICATION FUNCTION 1 | DATA AA | DATA AB | DATA AC | DATA AD |
| VERIFICATION FUNCTION 2 | DATA BA | DATA BB | DATA BC | DATA BD |
| VERIFICATION FUNCTION 3 | DATA CA | DATA CB | DATA CC | DATA CD |
| VERIFICATION FUNCTION 4 | DATA DA | DATA DB | DATA DC | DATA DD |

| PROGRAM 2 | | | | |
|---|---|---|---|---|
| VERIFICATION RESULT | VERIFICATION CONDITION a | VERIFICATION CONDITION b | VERIFICATION CONDITION c | VERIFICATION CONDITION d |
| VERIFICATION FUNCTION 1 | DATA EA | DATA EB | DATA EC | DATA ED |
| VERIFICATION FUNCTION 2 | DATA FA | DATA FB | DATA FC | DATA FD |
| VERIFICATION FUNCTION 3 | DATA GA | DATA GB | DATA GC | DATA GD |
| VERIFICATION FUNCTION 4 | DATA HA | DATA HB | DATA HC | DATA HD |

FIG. 3
EXAMPLE 1
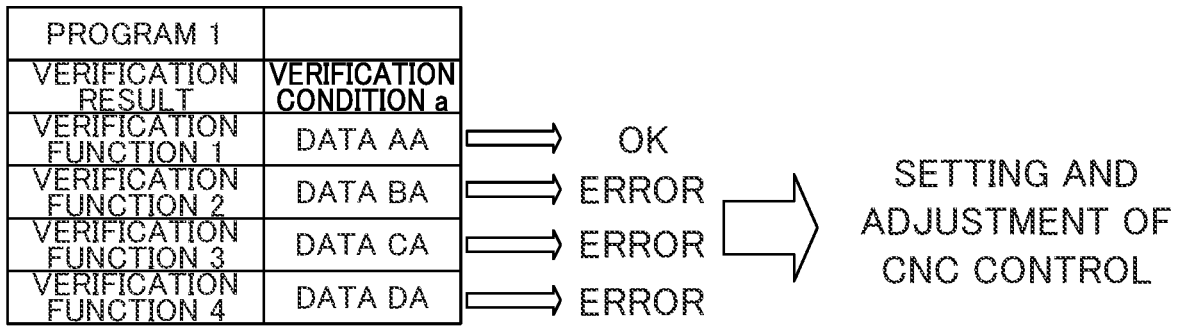
EXAMPLE 2
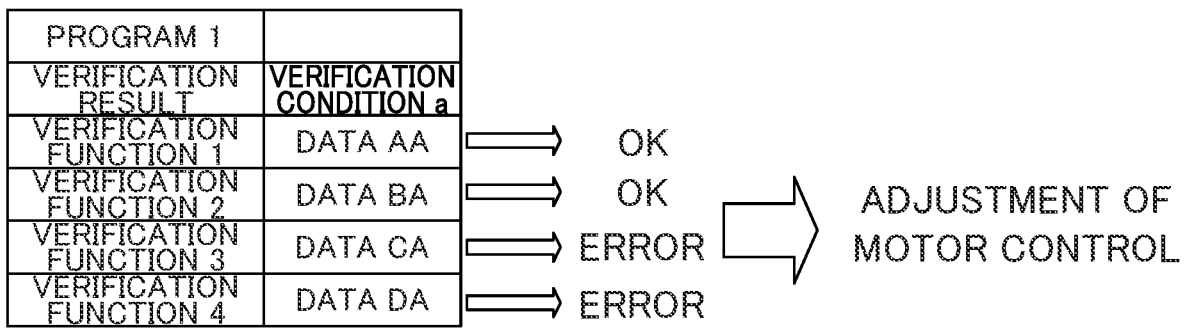
EXAMPLE 3
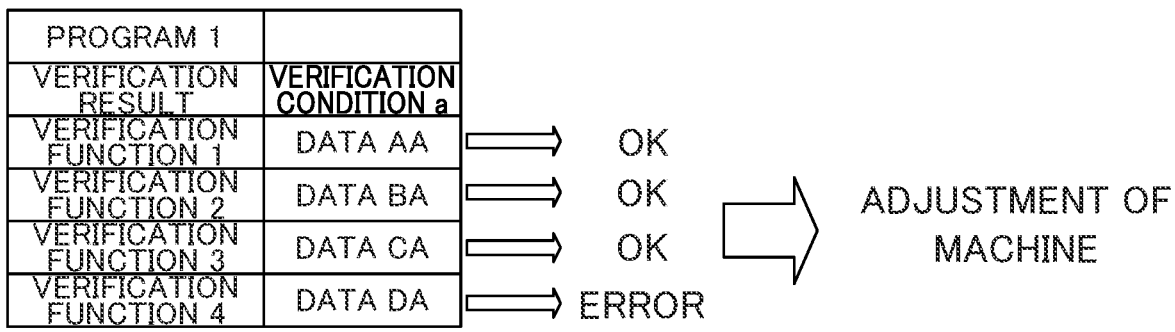

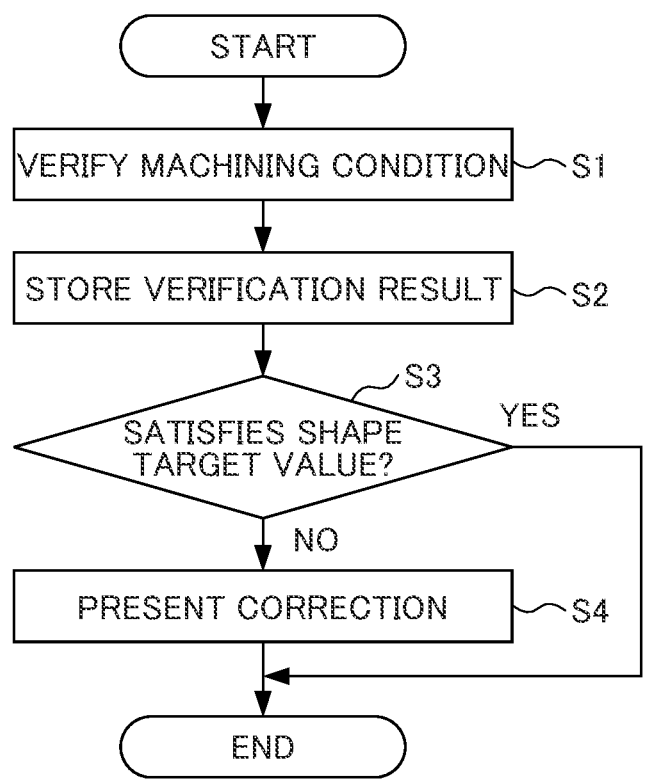

ASSISTANCE DEVICE FOR ANALYZING MACHINING CONDITIONS OF A MACHINE TOOL

TECHNICAL FIELD

The present invention relates to an assistance device.

BACKGROUND ART

In industrial machines such as a CNC (computerized numerical control) machine tool, it is necessary to analyze the machining conditions using a validation function such as machining simulation in order to obtain the optimized machined shape of a workpiece, and find the optimized machining conditions. In order to find such optimized machining conditions, an operator using the machine tool varies various settings based on a machining manual and past experience, and executes a machining program or executes simulation. Simulation for analyzing the machining conditions in such industrial machines has been known (for example, refer to Patent Document 1).

Patent Document 1: Japanese Unexamined Patent Application, Publication No. 2007-102632

DISCLOSURE OF THE INVENTION

Problems to be Solved by the Invention

However, the operator has required time for finding the optimized machining conditions for changing the various settings based on the machining manual, past experience, etc. Therefore, an assistance device which can find optimized machining conditions more easily has been desired.

Means for Solving the Problems

An assistance device according to an aspect of the present disclosure is an assistance device for determining machining conditions of a workpiece in an industrial machine that machines the workpiece based on a machining program, the assistance device including: a program management section that stores verification results verifying the machining conditions by a plurality of verification functions in a verification result storage section to be associated with the machining program; a determination section which determines whether each verification result satisfies a shape target value of the workpiece; and an advice section which presents a correction of the machining condition, based on machining condition-related information related to the machining conditions of the workpiece, the verification result and the verification function, in a case of any of respective verification results not satisfying the shape target values of the workpiece.

Effects of the Invention

According to the present invention, it is possible to find optimized machining conditions more easily.

BRIEF DESCRIPTION OF THE DRAWINGS

FIG. 2 is a view showing an example of verification results;

FIG. 3 is a view showing an example of presenting correction of machining conditions; and FIG. 4 is a flowchart showing processing of the assistance device.

PREFERRED MODE FOR CARRYING OUT THE INVENTION

Figure 1:
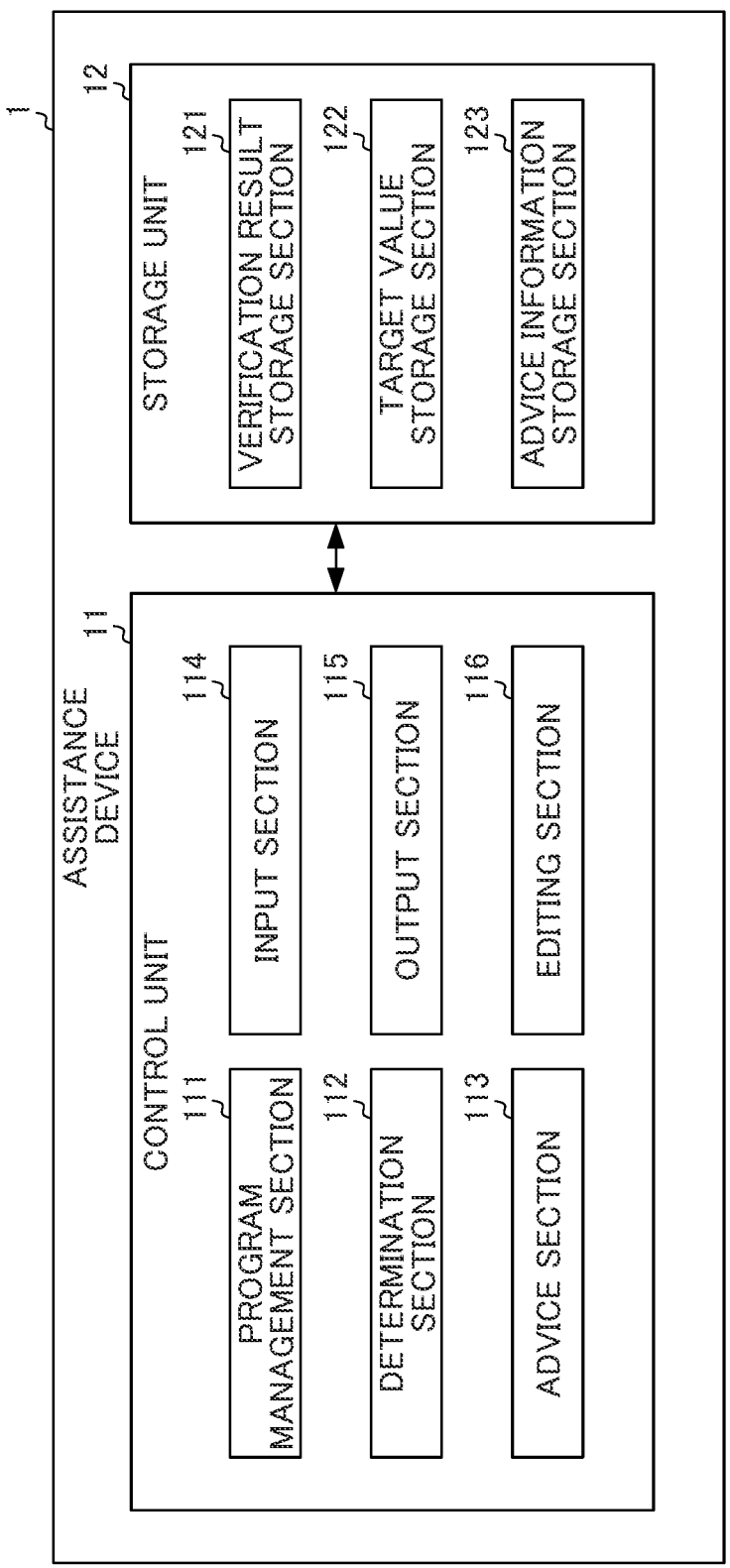
FIG. 1 is a view showing an outline of an assistance device according to an embodiment of the present invention.

Hereinafter, an example of an embodiment of the present invention will be explained. FIG. 1 is a view showing an outline of an assistance device 1 according to the present embodiment. The assistance device 1 assists execution of simulation of a plurality of modes related to industrial machines such as a CNC machine tool which machines a workpiece based on a machining program. The assistance device 1 may be incorporated into the industrial machine, or may be a computer device independent from the industrial machine.

The industrial machine such as a CNC machine tool has various simulation functions (verification functions) related to machining and operation. The industrial machine executes these simulation functions as necessary. As shown in FIG. 1, the assistance device 1 includes a control unit 11 and a storage unit 12.

The control unit 11 is a processor such as a CPU (Central Processing Unit), and functions as a program management section 111, determination section 112, advice section 113, input section 114, output section 115 and editing section 116, by executing the programs stored in the storage unit 12.

The storage unit 12 is a storage device such as ROM (Read Only Memory) storing the OS (Operating System) and/or application programs, etc., RAM (Random Access Memory), a hard disk drive or SSD (Solid State Drive) storing other various information, etc. In addition, the storage unit 12 includes a verification result storage section 121, set value storage section 122, and advice information storage section 123.

It should be noted that, in the case of the assistance device 1 being a computer device independent from the industrial machine, the assistance device 1 includes a communication unit (not shown) for wired or wireless communication with the industrial machine via a network. The communication unit includes a processor, contactor, electrical circuit, etc. for executing communication. The communication unit acquires data by performing predetermined processing in communication signals received from the industrial machine, and inputs the acquired data to the control unit 11. In addition, the communication unit generates communication signals by performing predetermined processing on the data inputted from the control unit 11, and sends the generated communication signals to the industrial machine.

The program management section 111 causes the verification results prepared by verifying the machining conditions by various verification functions to be stored in the verification result storage section 121 to be associated with the machining program.

Herein, the verification functions includes a tool path simulation in CAM (computer aided manufacturing), a machining simulation in CNC (computerized numerical control), shape display based on feedback of the motor, and measurement results obtained by measuring the workpiece with a three-dimensional measuring instrument. It should be noted that the shape display based on feedback of the motor shows the display of simulation of the machined shape based on the feedback of the motor according to the machining operation not using the workpiece.

In addition, the verification conditions include the conditions of the CNC parameters prepared in advance by the CNC maker, operating conditions of the industrial machine prepared in advance by the industrial machine maker, personal conditions related to the tools, etc. defined by the operator, etc.

The determination section 112 determines whether each verification result stored in the verification result storage section 121 satisfies the shape target value of the workpiece stored in the target value storage section 122. Herein, target value storage section 122 stores in advance the shape target value of the workpiece for machining the workpiece. The shape target value includes the target values for the shape tolerance, etc.

The advice section 113 presents correction of the machining conditions based on machining condition-related information related to the machining conditions of the workpiece, verification results and verification function, in the case of any of the respective verification results not satisfying the shape target value of the workpiece, in the determination section 112.

For example, the advice section 113, in the case of any of the respective verification results not satisfying the shape target values of the workpiece in the determination section 112, displays information (for example, advice to the operator) prompting correction of the machining conditions based on the machining condition-related information on a display unit (not shown) of the assistance device 1.

Herein, the machining condition-related information is stored in the advice information storage section 123. More specifically, the advice information storage section 123 stores the verification function corresponding to the verification result not satisfying the shape target value of the workpiece and information prompting correction of the machining conditions corresponding to this verification function, to be associated as machining condition-related information.

The input section 114 inputs the verification result from verifying the machining conditions by a plurality of verification functions in machining program units. For example, the input section 114 accepts input of verification results from outside in machining program units, and sends the accepted verification results to the program management section 111.

The output section 115 outputs the verification results from verifying the machining conditions by the plurality of verification functions in machining program units. For example, the output section 115 outputs the verification results stored in the verification result storage section 121 in machining program units to external equipment. It should be noted that, for the machining program, since sub-program files may be called out and executed from the main program file, the machining program is configured by a single or plurality of files.

The editing section 116 edits the verification conditions of the verification results stored in the verification result storage section 121 and the shape target values stored in the target value storage section 122. The verification condition and shape target values can thereby be set and customized by the operator of the like using the industrial machine.

FIG. 2 is a view showing an example of verification results. As shown in FIG. 2, in the verification result storage section 121, the verification results from verifying the machining conditions by the plurality of verification functions 1 to 4 are associated with machining programs 1 and 2. In addition, the verification results include data of verification results related to each of the verification functions 1 to 4 for verification conditions a to d.

It should be noted that, in the examples of FIGS. 2 and 3, the verification function 1 is a tool-path simulation of CAM, the verification function 2 is a machining simulation of CNC, the verification function 3 is a shape display based on feedback of the motor, and the verification function 4 is a measurement result from measuring by a three-dimensional measuring instrument.

FIG. 3 is a view showing an example of presenting correction of machining conditions. The example shown in FIG. 3 includes an example of correction of the machining conditions presented by the advice section 113, in the case of any of the respective verification results not satisfying the shape target value of the workpiece.

In Example 1, the determination section 112 determines that the verification result for the verification function 1 for verification condition a satisfies the shape target value of the workpiece (OK), and determines the verification results for verification functions 2 to 4 as not satisfying the shape target values of the workpiece (error).

Then, the advice section 113 references the advice information storage section 123, and presents correction of the machining conditions, based on the verification functions corresponding to the verification results not satisfying the shape target values of the workpiece, and information prompting correction of the machining conditions corresponding to these verification functions.

In the case of Example 1, since it is determined that the verification results for verification functions 2 to 4 do not satisfy the shape target values of the workpiece, for example, the advice section 113 presents information prompting setting and adjustment of the CNC control, as information for prompting correction of the machining conditions corresponding to the verification functions 2 to 4.

The information prompting setting and adjustment of CNC control, for example, includes enabling a smoothing function of machining, decreasing acceleration and deceleration of the machining speed, decreasing the speed difference at corner parts (reducing vibration of the machine by decelerating the machining speed at corner parts), etc.

Similarly, in Example 2, the determination section 112 determines the verification results for verification functions 1 and 2 as satisfying the shape target values of the workpiece (OK) for the verification condition a, and determines the verification results for verification functions 3 and 4 as not satisfying the shape target values of the workpiece (error).

Due to being determined that the verification results for verification functions 3 and 4 are not satisfying the shape target values of the workpiece, for example, the advice section 113 presents information prompting adjustment of the motor control, as information prompting correction of the machining conditions corresponding to the verification functions 3 and 4. The information prompting adjustment of motor control, for example, includes enabling a correction function for error reduction, enabling a function of raising tracking of the servomotor during cutting feed, etc.

Similarly, in Example 3, the determination section 112 determines the verification results for verification functions 1, 2 and 3 as satisfying the shape target values of the workpiece (OK) for the verification condition a, and determines the verification result for verification function 4 as not satisfying the shape target value of the workpiece (error).

Due to being determined that the verification result for the verification function 4 is not satisfying the shape target value of the workpiece, for example, the advice section 113 presents information prompting adjustment of the machine as information prompting correction of the machining conditions corresponding to the verification function 4. The information prompting adjustment of the machine, for example, includes adjusting the balance of the spindle and tool, checking for external vibration, etc.

In addition, in the case of the data of verification results for any of verification functions 1 to 4 not existing, since the data of verification results is insufficient, the advice section 113 may present information prompting additional verification, as information prompting correction of the machining conditions.

FIG. 4 is a flowchart showing processing of the assistance device 1. In Step S1, each verification function verifies machining conditions, and the input section 114 inputs the verification results from verifying the machining conditions by the plurality of verification functions in machining program units. In Step S2, the program management section 111 stores the verification results from verifying the machining conditions by the plurality of verification functions in the verification result storage section 121 to be associated with the machining program.

In Step S3, the determination section 112 determines whether the respective verification results stored in the verification result storage section 121 satisfy the shape target value of the workpiece stored in the target value storage section 122. In the case of the respective verification results satisfying the shape target values of the workpiece (YES), the processing subsequently ends. In the case of the respective verification results not satisfying the shape target values of the workpiece (NO), the processing advances to Step S4.

In Step S4, the advice section 113 presents a correction of the machining conditions based on the machining condition-related information.

As explained above, according to the present embodiment, the assistance device 1 includes: the program management section 111 which stores the verification results from verifying the machining conditions by the plurality of verification functions in the verification result storage section 121 to be associated with the machining program; the determination section 112 which determines whether the respective verification results satisfy the shape target values of the workpiece; and the advice section 113 which presents correction of the machining conditions based on the machining condition-related information related to the machining conditions of the workpiece, the verification results and the verification functions, in the case of any of the respective verification results not satisfying the shape target values of the workpiece. The assistance device 1 can thereby comprehensively determine the verification results by the plurality of verification functions, and present correction of machining conditions in order to satisfy the shape target values. Therefore, by using such an assistance device 1, the operator of the industrial machine can more easily find the optimal machining conditions for obtaining the optimal machined shape, without changing various settings based on the machining manual, past experience, etc.

In addition, the assistance device 1 further includes the advice information storage section 123 which stores the verification function corresponding to the verification result not satisfying the shape target value of the workpiece and the information prompting correction of the machining condition corresponding to this verification function, to be associated as machining condition-related information. The assistance device 1 can thereby more easily find the optimal machining conditions, by presenting information prompting correction of the machining conditions.

In addition, the assistance device 1 further includes the input section 114 which inputs verification results in machining program units, and the output section 115 which outputs verification results in machining program units. The assistance device 1 thereby becomes able to input verification results from outside, and output verification results to outside. In addition, by outputting the verification results in machining program units, it becomes possible for external equipment to use the verification results.

In addition, the assistance device 1 further includes the editing section 116 which edits the verification conditions and shape target values for the verification results. The assistance device 1 can thereby set and customize the verification conditions and shape target values by the operator or the like using the industrial machine.

In addition, the verification functions include a tool path simulation in CAM, a machining simulation in CNC, a shape display based on feedback of the motor, and measurement results from measuring the workpiece by a three-dimensional measuring instrument. The assistance device 1 can thereby present corrections of the machining conditions using the appropriate verification function for obtaining the optimal machined shape.

It should be noted that, in the aforementioned embodiment, the advice information storage section 123 stores the verification function corresponding to the verification result not satisfying the shape target value of the workpiece, and information prompting correction of the machining condition corresponding to this verification function to be associated as machining condition-related information. However, for example, the priority order may be set between the respective verification functions. Then, in the case of the verification results related to the plurality of verification functions not satisfying the shape target values of the workpiece, the advice section 113 may present a correction of the machining condition related to the verification function having high priority order.

Although an embodiment of the present invention has been explained above, the present invention is not to be limited to the aforementioned embodiment. In addition, the effects described in the present embodiment are merely listing the most preferred effects produced from the present invention, and the effects from the present invention are not to be limited to those disclosed in the present embodiment.

EXPLANATION OF REFERENCE NUMERALS 1 assistance device
11 control unit
12 storage unit
111 program management section
112 determination section
113 advice section
114 input section
115 output section
116 editing section
121 verification result storage section
122 target value storage section
123 advice information storage section

The invention claimed is:

1. An assistance device for determining machining conditions of a workpiece in an industrial machine that machines the workpiece based on a machining program, the assistance device comprising:
a processor; and
a memory;

wherein the processor is configured to:
store, in the memory, verification results verifying the machining conditions by a plurality of verification functions to be associated with the machining program;
determine whether each verification result satisfies a shape target value of the workpiece;
present to an operator of the machine a correction of the machining conditions determined by the processor based on machining condition-related information related to the machining conditions of the workpiece, the verification result, and the verification function, in a case of any of respective verification results not satisfying the shape target values of the workpiece;
store the verification function corresponding to the verification result not satisfying the shape target value of the workpiece, and information including advice to the operator prompting correction by the operator of the machining conditions corresponding to this verification function, as machining condition-related information; and
when any of the respective verification results do not satisfy the shape target values of the workpiece, present to the operator the correction of the machining conditions based on the verification functions corresponding to the verification results not satisfying the shape target values of the workpiece, and information prompting correction by the operator of the machining conditions corresponding to the verification functions;
wherein the information prompting correction of the machining condition comprises information prompting setting and adjustment of a CNC (computerized numerical control) control; and
the information prompting setting and adjustment of the CNC control includes enabling a smoothing function of machining, decreasing acceleration and deceleration of the machining speed, and decreasing a speed difference at corner parts.

2. The assistance device according to claim 1, wherein the information prompting correction of the machining condition comprises information prompting adjustment of a motor control, or information prompting adjustment of the machine.

3. The assistance device according to claim 1, wherein the processor inputs the verification result in units of the machining program.

4. The assistance device according to claim 1, wherein the processor outputs the verification results in units of the machining program.

5. The assistance device according to claim 1, wherein the processor edits verification conditions of the verification result and the shape target value.

6. The assistance device according to claim 1, wherein the verification function includes a tool path simulation in CAM (computer aided manufacturing), a machining simulation in CNC (computerized numerical control), shape display based on feedback of a motor, and a measurement result from measuring the workpiece by a three-dimensional measuring instrument.

* * * * *